(12) United States Patent
Joseck et al.

(10) Patent No.: US 9,212,325 B2
(45) Date of Patent: Dec. 15, 2015

(54) DIESEL FUEL PRODUCTION DURING LUBRICANT BASE OIL HYDROPROCESSING

(75) Inventors: Eric D. Joseck, Burke, VA (US); Michael Brian Carroll, Mantua, NJ (US); David Mentzer, Marshall, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 529 days.

(21) Appl. No.: 13/611,178

(22) Filed: Sep. 12, 2012

(65) Prior Publication Data

US 2013/0066122 A1    Mar. 14, 2013

Related U.S. Application Data

(60) Provisional application No. 61/533,899, filed on Sep. 13, 2011.

(51) Int. Cl.
| | |
|---|---|
| *C10G 65/12* | (2006.01) |
| *C10G 65/02* | (2006.01) |
| *C10G 47/12* | (2006.01) |
| *C10G 45/58* | (2006.01) |
| *C10G 45/06* | (2006.01) |
| *C10G 47/06* | (2006.01) |
| *C10G 49/22* | (2006.01) |

(52) U.S. Cl.
CPC ............... *C10G 45/06* (2013.01); *C10G 47/06* (2013.01); *C10G 49/22* (2013.01); *C10G 65/02* (2013.01); *C10G 2300/107* (2013.01); *C10G 2300/1014* (2013.01); *C10G 2300/1018* (2013.01); *C10G 2300/1022* (2013.01); *C10G 2300/1077* (2013.01); *C10G 2300/202* (2013.01); *C10G 2300/301* (2013.01); *C10G 2300/304* (2013.01); *C10G 2300/307* (2013.01); *C10G 2400/02* (2013.01); *C10G 2400/04* (2013.01); *C10G 2400/10* (2013.01)

(58) Field of Classification Search
CPC ............... C10G 2300/1014; C10G 2300/1018; C10G 2300/1022; C10G 2300/107; C10G 2300/1077; C10G 2300/202; C10G 2300/301; C10G 2300/304; C10G 2300/307; C10G 2400/02; C10G 2400/04; C10G 2400/10
See application file for complete search history.

(56) References Cited

U.S. PATENT DOCUMENTS

| | | | |
|---|---|---|---|
| 4,283,271 | A | 8/1981 | Garwood et al. |
| 4,325,805 | A | 4/1982 | Miller |

(Continued)

FOREIGN PATENT DOCUMENTS

| | | | |
|---|---|---|---|
| EP | 0189648 | A1 | 8/1986 |

OTHER PUBLICATIONS

Johnson, M.F.L., Jour. Catal., (1978) 52, 425.

(Continued)

*Primary Examiner* — Renee E Robinson
*Assistant Examiner* — Derek Mueller
(74) *Attorney, Agent, or Firm* — Robert A. Migliorini

(57) ABSTRACT

Conditions selected for lubricant base oil production can be used to also produce a high quality diesel product. The diesel product can have a cetane index or cetane number of at least 55, corresponding to a high value diesel fuel. The diesel product can also have good cold flow properties, such as a pour point of −40° C. or less and/or a cloud point of −25° C. or less. Additionally, the sulfur content of the diesel product can be low, such as less than 1 wppm. This can allow the diesel product to be blended with other potential diesel boiling range products that have a higher sulfur content while still meeting an overall diesel fuel specification. The aromatics content can also be low, allowing the premium diesel to comply with various regulatory requirements.

20 Claims, 4 Drawing Sheets

(56) References Cited

U.S. PATENT DOCUMENTS

| | | |
|---|---|---|
| 6,884,339 B2 | 4/2005 | Benazzi et al. |
| 7,250,106 B2 | 7/2007 | Benazzi et al. |
| 7,371,315 B2 | 5/2008 | Benazzi et al. |
| 2010/0187155 A1* | 7/2010 | McCarthy ............. C10G 45/12 208/58 |

OTHER PUBLICATIONS

International Search Report and Written Opinion of PCT/US2012/054801 dated Nov. 29, 2012.

* cited by examiner

| | Medium Base Stock | Cut 1 (Naphtha) | Cut 2 (Premium Diesel) | Cut 3 (Diesel) | Cut 4 (Diesel) | Cut 5 (Diesel) | Cut 6 (Diesel) | Cut 7 (Lubricant Base Stock) |
|---|---|---|---|---|---|---|---|---|
| Yield (wt%) | 100 | 2.66 | 22.26 | 5.17 | 1.50 | 2.21 | 2.21 | 63.98 |
| T99.5 (°C) | 538 | 207.8 | 392.2 | 413.9 | 421.1 | 426.3 | 430.4 | 514.6 |
| Density @ 100°C (g/cm³) | 0.7900 (calculated) | 0.7026 (calculated) | 0.7753 (calculated) | 0.7953 | 0.7966 | 0.7970 | 0.7973 | 0.7991 |
| Density @ 70°C (g/cm³) | 0.8092 | 0.7259 | 0.7956 | 0.8146 (calculated) | 0.8157 (calculated) | 0.8161 (calculated) | 0.8163 (calculated) | 0.8177 (calculated) |
| Density @ 15°C (g/cm³) | 0.8444 | 0.7687 | 0.8329 | 0.8498 (calculated) | 0.8506 (calculated) | 0.8510 (calculated) | 0.8510 (calculated) | 0.8518 (calculated) |
| Viscosity @ 100°C (cSt) | | | | 3.3742 | 3.8067 | 4.0125 | 4.1866 | 6.1425 |
| Noack vol. (wt%) | | | | 41.8 | 29.0 | 24.3 | 21.2 | 6.3 |
| Pour point (°C) | −24 | | −51 | −34 | −35 | −33 | −31 | −18 |
| Cloud point (°C) | | | −36 | | | | | |
| Cetane number | | | 60.2 | | | | | |
| S (wppm) | | 0.69 | 0.12 | | | | | |
| Aromatics (wt%) | | | <1 | | | | | |

FIG. 3

| | Light Base Stock | Cut 1 (Naphtha) | Cut 2 (Premium Diesel) | Cut 3 (Diesel) | Cut 4 (Diesel) | Cut 5 (Diesel) | Cut 6 (Diesel) | Cut 7 (Lubricant Base Stock) |
|---|---|---|---|---|---|---|---|---|
| Yield (wt%) | 100 | 3.99 | 29.94 | 7.96 | 2.05 | 2.00 | 1.94 | 51.79 |
| T99.5 (°C) | 468.8 | 210.4 | 391.2 | 410.2 | 412.0 | 410.0 | 412.3 | 474.8 |
| Density @ 100°C (g/cm³) | 0.7790 (calculated) | 0.7033 (calculated) | 0.7728 (calculated) | 0.7820 | 0.7821 | 0.7820 | 0.7822 | 0.7873 |
| Density @ 70°C (g/cm³) | 0.7985 | 0.7265 | 0.7930 | 0.8013 (calculated) | 0.8014 (calculated) | 0.8012 (calculated) | 0.8014 (calculated) | 0.8063 (calculated) |
| Density @ 15°C (g/cm³) | 0.8343 | 0.7691 | 0.8301 | 0.8365 (calculated) | 0.8366 (calculated) | 0.8364 (calculated) | 0.8366 (calculated) | 0.8410 (calculated) |
| Viscosity @ 100°C (cSt) | | | | 3.1499 | 3.2499 | 3.2533 | 3.338 | 4.3303 |
| Noack vol. (wt%) | | | | 40.0 | 35.8 | 35.3 | 32.2 | 15.7 |
| Pour point (°C) | −26 | | −53 | −35 | −38 | −36 | −34 | −20 |
| Cloud point (°C) | | | −33.9 | | | | | |
| Cetane number | | | 61.3 | | | | | |
| S (wppm) | | < 0.03 | 0.08 | | | | | |
| Aromatics (wt%) | | | < 1 | | | | | |

FIG. 4

DIESEL FUEL PRODUCTION DURING LUBRICANT BASE OIL HYDROPROCESSING

CROSS-REFERENCE TO RELATED APPLICATION

This application claims priority to U.S. Provisional Application Ser. No. 61/533,899 filed Sep. 13, 2011, herein incorporated by reference.

FIELD

This disclosure provides a system and a method for processing of sulfur- and/or nitrogen-containing feedstocks to produce diesel fuels and lubricant oil base oils.

BACKGROUND

Hydrocracking of hydrocarbon feedstocks is often used to convert lower value hydrocarbon fractions into higher value products, such as conversion of vacuum gas oil (VGO) feedstocks to various fuels and lubricants. Typical hydrocracking reaction schemes can include an initial hydrotreatment step, a hydrocracking step, and a post hydrotreatment step, such as dewaxing or hydrofinishing. After these steps, the effluent can be fractionated to separate out a desired diesel fuel and/or lubricant oil base oil.

A process train for hydrocracking a feedstock can be designed to emphasize the production of fuels or the production of lubricant base oils. During fuels hydrocracking, typically the goal of the hydrocracking is to cause conversion of higher boiling point molecules to molecules boiling in a desired range, such as the diesel boiling range, kerosene boiling range, and/or naphtha boiling range. Many types of fuels hydrocracking processes also generate a bottoms component from hydrocracking that potentially can be used as a lubricant base oil. However, the lubricant base oil is produced in a lesser amount, and often is recycled and/or hydrocracked again to increase the fuels yield. In hydrocracking for forming a lubricant base oil the goal of the hydrocracking is typically to remove contaminants and/or provide viscosity index uplift for the feed. This results in some feed conversion, however, so that a hydrocracking process for generating a lubricant base oil typically produces a lesser amount of fractions that boil in the diesel boiling range, kerosene boiling range, and/or naphtha boiling range. Due to the difference in the desired goats, the overall process conditions during fuels hydrocracking of a given feedstock typically differ from the overall process conditions during hydrocracking for lubricant base oil production on a similar type of feedstock.

U.S. Pat. No. 6,884,339 describes a method for processing a feed to produce a lubricant base oils. A feed is hydrotreated and then hydrocracked without intermediate separation. An example of the catalyst for hydrocracking can be a supported Y or beta zeolite. The catalyst also includes a hydro-dehydrogenating metal, such as a combination of Ni and Mo. The hydrotreated, hydrocracked effluent is then atmospherically distilled. The portion boiling above 340° C. is catalytically dewaxed in the presence of a bound molecular sieve that includes a hydro-dehydrogenating element. The molecular sieve can be ZSM-48, EU-2, EU-11, or ZBM-30. The hydro-dehydrogenating element can be a noble Group VIII metal, such as Pt or Pd. A distillate fraction is mentioned as a possible additional product, the distillate fraction having a pour point of less than about −20° C., a total aromatics content of less than 2 wt %, a polyaromatic compounds content of less than 1 wt %, and a cetane index of about 52 or more. The amount of this distillate fraction is not specified.

U.S. Pat. No. 7,371,315 describes a method for producing a lubricant base oils. A feed is provided with a sulfur content of less than 1000 wppm. Optionally, the feed can be a hydrotreated feed. Optionally, the feed can be a hydrocracked feed, such as a feed hydrocracked in the presence of a zeolite Y-containing catalyst. The feed is converted on a noble metal on an acidic support. This entire converted feed can be dewaxed in the presence of a dewaxing catalyst. A distillate fraction with a pour point of −20° C. and a cetane value of 50 is mentioned as a possible additional product, but the amount of this distillate fraction is not specified.

U.S. Pat. No. 7,250,106 describes a method for producing lubricant base oils by hydroprocessing a feedstock over a specialized catalyst followed by dewaxing of at least a portion of the effluent. A gas oil (distillate) with a pour point of −18° C. and cetane number of 60 is reported as a side product.

SUMMARY

In an embodiment, a method for producing a diesel fraction and a lubricant base oil is provided. The method includes contacting a feedstock having a T5 boiling point of at least about 650° F. (343° C.) with a hydrocracking catalyst under effective hydrocracking conditions for lubricant base oil production to produce a hydrocracked effluent; dewaxing the hydrocracked effluent under effective catalytic dewaxing conditions in the presence of a dewaxing catalyst; hydrofinishing the hydrocracked, dewaxed effluent under effective hydrofinishing conditions in the presence of a hydrofinishing catalyst; and fractionating the hydrofinished effluent to produce at least a naphtha product fraction, a first diesel fraction, a second diesel fraction having a higher cut point temperature than a cut point temperature for the first diesel fraction, and a lubricant base oil fraction, the lubricant base oil fraction comprising at least about 50 wt % of the hydrofinished effluent, the first diesel fraction having a pour point of about −40° C. or less, a cetane number of at least about 55, and a sulfur content of less than about 1 wppm.

In another embodiment, a method is provided for producing a diesel fraction and a lubricant base oil. The method includes contacting a feedstock having a T5 boiling point of at least about 650° F. (343° C.) with a hydrocracking catalyst under effective hydrocracking conditions for lubricant base oil production to produce a hydrocracked effluent; dewaxing the hydrocracked effluent under effective catalytic dewaxing conditions in the presence of a dewaxing catalyst; hydrofinishing the hydrocracked, dewaxed effluent under effective hydrofinishing conditions in the presence of a hydrofinishing catalyst; and fractionating the hydrocracked, dewaxed effluent to produce at least a naphtha product fraction, a first diesel fraction having a cetane number of at least 55, a second diesel fraction having a higher cut point temperature than a cut point temperature for the first diesel fraction, and a lubricant base oil fraction, the lubricant base oil fraction comprising at least about 50 wt % of the hydrocracked, dewaxed effluent, the first diesel fraction comprising at least about 20 wt % of the hydrocracked, dewaxed effluent, the second diesel fraction having a weight that is at least about 20% of a weight of the first diesel fraction, wherein the first diesel fraction has a density at a first temperature that is less than a density at the first temperature for the hydrocracked dewaxed effluent, the second diesel fraction having a density at the first temperature that is greater than the density at the first temperature for the hydrocracked dewaxed effluent.

In still another embodiment, a method for producing a diesel fraction and a lubricant base oil is provided. The method includes contacting a feedstock having a T5 boiling point of at least about 700° F. (343° C.) with a hydrocracking catalyst under effective hydrocracking conditions to produce a liquid hydrocracked effluent, the effective hydrocracking conditions being effective for reducing the sulfur content of the liquid hydrocracked effluent to about 1 wppm or less, the 700+° F. conversion of the feedstock being about 30% or less; fractionating liquid hydrocracked effluent to form a first fraction and a lubricant boiling range fraction, the lubricant boiling range fraction comprising at least 50 wt % of the liquid hydrocracked effluent; dewaxing the first fraction under first effective catalytic dewaxing conditions in the presence of a dewaxing catalyst; and fractionating the hydrocracked, dewaxed first fraction to produce at least a naphtha product fraction, a first diesel fraction having a T99.5 boiling point of about 393° C. or less, and a second diesel fraction having a higher T99.5 temperature than the first diesel fraction, a weight of the second diesel fraction being at least about 20% of a weight of the first diesel fraction, the first diesel fraction having a pour point of about −40° C. or less, a cetane number of at least about 55, and a sulfur content of less than about 1 wppm.

BRIEF DESCRIPTION OF THE DRAWINGS

FIGS. 3 and 4 show data related to fuels and lubricant base oil fractions formed according to embodiments of the invention.

DETAILED DESCRIPTION

Figure 1:
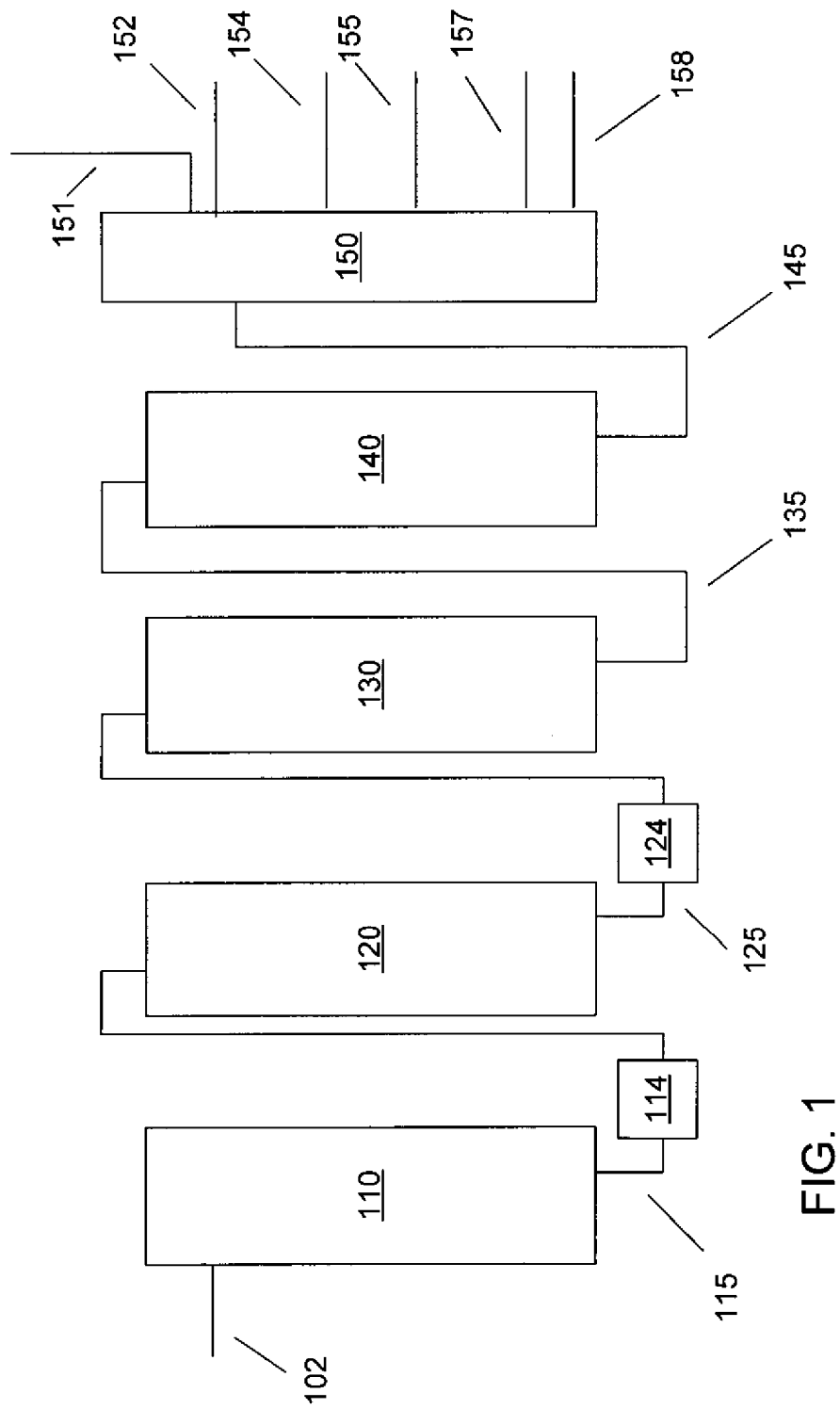
FIG. 1 schematically shows an example of a multi-stage reaction system according to an embodiment of the invention.

All numerical values within the detailed description and the claims herein are modified by "about" or "approximately" the indicated value, and take into account experimental error and variations that would be expected by a person having ordinary skill in the art.

Overview

In various embodiments, a process train with process conditions selected for lubricant base oil production can be used to also produce a high quality diesel product. The diesel product can have a cetane index or cetane number of at least 55, or at least 60, corresponding to a high value diesel fuel. The diesel product can also have good cold flow properties, such as a pour point of −40° C. or less and/or a cloud point of −25° C. or less. Additionally, the sulfur content of the diesel product can be low, such as less than 1 wppm. This can allow the diesel product to be blended with other potential diesel boiling range products that have a higher sulfur content while still meeting an overall diesel fuel specification. The aromatics content can also be low, allowing the premium diesel to comply with various regulatory requirements. This combination of properties results in an diesel fuel suitable for use in wide range of environments, or alternatively a diesel fraction that can be blended with an inferior diesel fraction to generate a fuel meeting a desired specification. It is noted that this beneficial diesel fraction is generated from a process that is otherwise designed for lubricant base oil production, as opposed to a process designed for fuels production.

Diesel or Distillate Product Properties

A desired premium diesel product can be generated by performing a process on a suitable feedstock for generation of a lubricant base oil (which could also be referred to as a lubricant base stock). The process can typically include hydrocracking, catalytic dewaxing, and hydrofinishing of the feedstock. The total liquid effluent from the lubricant base oil production process can then be fractionated. Optionally, any gas phase molecules can be separated before fractionation, or the gas phase molecules and/or light ends can be separated as a fraction during fractionation. Optionally, the hydrofinishing can be performed after the fractionation. In the fractionation, a plurality of fuels fractions are generated or formed. This allows a desired premium diesel or distillate fraction to be generated while excluding other naphtha boiling range and/or diesel boiling range molecules that would result in less favorable properties for the desired fraction. In the fractionation, in addition to one or more lubricant base oil fractions, at least three fuels fractions can be produced. The fuels fractions include the desired premium diesel or distillate fraction, one or more fuels fractions with a lower density and lower initial boiling point than the premium diesel or distillate fraction, and one or more diesel or distillate fractions with a higher initial boiling point and a higher density than the premium diesel or distillate fraction.

In the discussion below, in order to improve readability, the premium diesel or distillate fraction will be referred to as a premium diesel fraction. This is not intended to limit the potential use or characterization of the premium diesel fraction, however. Thus, the premium diesel fraction described herein can alternatively be used, in whole or in part, to form a premium kerosene fraction, a premium jet fuel fraction, or any other type of fraction that is appropriate based on the boiling ranges described for the premium diesel fraction.

A goal of generating a premium diesel fraction or product can be to provide a fraction with beneficial product qualities. The premium diesel fraction can have beneficial product qualities that include a cetane number of at least 55, preferably at least 60, or at least 61, or at least 62; a sulfur content of 1.0 wppm or less, or 0.5 wppm or less, or 0.4 wppm or less, or 0.3 wppm or less; a pour point of −40° C. or less, or −45° C. or less, or −50° C. or less; a cloud point of −25° C. or less, or −30° C. or less, or −33° C. or less; a total aromatics content of less than 1 wt %; and/or a polynuclear aromatics content of less than 0.5 wt %. In various embodiments, the premium diesel product can have at least one of the above beneficial product qualities, or at least two of the above, or at least three of the above, or at least four of the above, or at least five of the above. This type of fraction can be used as a high quality diesel fuel, or as a blending component for other diesel fractions or other hydrocarbon fractions. Alternatively, some or all of the premium diesel fraction can be used as a jet fuel fraction.

In some embodiments, the premium diesel or distillate fraction can correspond to at least 50% by weight of the total fuels in the fuels fractions produced by the fractionator, or at least 55% by weight, or at least 60% by weight. Relative to total liquid effluent from the lubricant base oil production process, the premium diesel fraction can be at least 20% by weight, or at least 22% by weight, or at least 25% by weight. Note that the lubricant base oil portion can represent at least 50% by weight of the total liquid effluent, or at least 55% by weight, or at least 60% by weight. The amount of lubricant base oil and premium diesel in the total liquid effluent can be dependent on the boiling point distribution of the initial feed, with lower boiling feeds tending to have a higher percentage of premium distillate or diesel and a lower percentage of lubricant base oil.

The premium diesel fraction and the additional fuels fractions can be characterized based on the boiling point ranges of the fractions, the densities of the fractions, and the cold flow properties of the fractions. In addition to characterizing the fractions relative to each other, in some embodiments the characteristics of the total liquid effluent can be used as a guide for determining the cut points for generating the premium diesel fraction.

With regard to the total liquid effluent from the process for producing a lubricant base oil, the total liquid effluent can have a pour point of −15° C. or less, preferably −20° C. or less, as determined according to ASTM D 97. The pour point of the total liquid effluent provides an indication that pour point of the desired diesel fraction will be in a desired range. The density of the total liquid effluent can also be characterized at various temperatures, such as according to ASTM D-287. The density of the total liquid effluent at 70° C. can be at least 0.7800, or at least 0.7900. Additionally or alternately, the density of the total liquid effluent at 70° C. can be 0.8200 or less, or 0.8100 or less. At 15° C., the density of the total liquid effluent can be at least 0.8200, or at least 0.8300. Additionally or alternately, the density of the total liquid effluent can be 0.8500 or less, or 0.8400 or less. The sulfur content of the total liquid effluent can be 8 wppm or less, or 5 wppm or less, or 2 wppm or less. This level of sulfur corresponds to a desired level of sulfur during generation of a lubricant base oil, as opposed to the less stringent sulfur requirements typically required for a fuels production process.

The total liquid effluent can be fractionated in order to generate the desired premium diesel fraction. The fractionation can be performed in any convenient manner, such as by vacuum fractionation. There are several ways of setting the cut points in the fractionator to generate the premium diesel fraction. Some cut points can be set based on boiling ranges. For example, a naphtha cut point can be set to produce a naphtha boiling range fraction. The naphtha cut point can be set to produce a naphtha cut with a final boiling point of 415° F. (213° C.) or less, or 400° F. (204° C.) or less, or 375° F. (191° C.) or less. The naphtha cut point can be used as the cut point of a single naphtha boiling range product, or several cuts can be generated from the naphtha range. Of course, during a typical fractionation process, there will be some overlap in boiling range between various cuts. Thus, if a naphtha fraction has a final boiling point of 400° F. (204° C.), the next higher cut in boiling range will typically have an initial boiling point of less than 400° F. (204° C.). As an alternative to using a final boiling point, the boiling point at which 99.5 wt % of a fraction boils can be used, or the T99.5 boiling point. In this alternative, the T99.5 boiling point can be 415° F. (213° C.) or less, or 400° F. (204° C.) or less, or 375° F. (191° C.) or less.

In addition to the naphtha boiling range cut point, another cut point can be set to generate the premium diesel fraction. The cut point for the premium diesel fraction can be set so that the final boiling point of the premium diesel fraction is 750° F. (399° C.) or less, or 740° F. (393° C.) or less, or 730° F. (338° C.) or less. Alternatively, the T99.5 boiling point of the premium diesel fraction can be 740° F. (393° C.) or less, or 734° F. (390° C.) or less, or 730° F. (388° C.) or less. At this type of cut point, some distillate boiling range molecules will likely be excluded from the premium diesel fraction. This can contribute to the beneficial product qualities of the premium diesel fraction.

The remaining cut points can be set to create as many additional fuels and/or lubricant base oil fractions as desired. In various embodiments, this can result in the fractionator producing one or more naphtha fractions, the premium diesel fraction, one or more additional diesel fractions, and one or more lubricant base oil fractions.

Another method can be to select the cut points to generate a premium diesel fraction with properties defined relative to the total liquid effluent. In an embodiment, the cut points can be set so that the density of the premium diesel fraction at a given temperature is lower than the density of the total liquid effluent at that temperature. For example, cut point for the premium diesel fraction can be selected to provide a fraction with a density at 70° C. that is less than the corresponding density of the total liquid effluent at 70° C. Another option can be to select a cut point so that the density of the premium diesel fraction at 15° C. is less than the density of the total liquid effluent at 15° C.

Still another cut point can correspond to the next lowest boiling diesel fraction after the premium diesel fraction. In the method above, cut points for the premium diesel fraction are selected based on a comparison of the density of the premium diesel fraction with the total liquid effluent. In some embodiments, the next cut point can be selected based on the amount of premium diesel generated by the premium diesel cut point. In such embodiments, the next cut point can be selected so that the weight of the next lowest boiling diesel fraction contains at least 20% of the weight of the premium diesel fraction. In such embodiments, for a total liquid effluent from a lubricant base oil production process, this will result in the next lowest boiling diesel fraction having a density greater than the density of the total liquid effluent. Since this is the next lowest boiling diesel fraction, all other diesel fractions that have a final boiling point higher than the premium diesel fraction will also have a density greater than the total liquid effluent. For example, consider a situation where a first cut point is set to define a naphtha fraction and a second cut point is set to define a premium diesel fraction. In this example, for convenience in illustrating the concept, 400 g of a total liquid effluent from a lubricant base oil production process is fractionated. Based on the naphtha and premium diesel cut points, the premium diesel fraction contains 100 g of the total liquid effluent. This premium diesel fraction has a density, lower than the density of the total liquid effluent. In this example, a third cut point is set to provide a next lowest boiling diesel fraction that contains at least 20 g of the total liquid effluent (i.e., at least 20% of the weight of the premium diesel).

Still another option can be to select the cut point for the premium diesel fraction based on density values. The cut point can be selected to generate a premium diesel fraction with a density at 70° C. of 0.8000 g/cm or less, or 0.7950 g/cm$^3$ or less. Additionally or alternately, the cut point can be selected to generate a premium diesel fraction with a density at 15° C. of 0.8400 g/cm$^3$ or less, or 0.8350 g/cm$^3$ or less.

Feedstocks

A wide range of petroleum and chemical feedstocks can be hydroprocessed in accordance with the present invention. Suitable feedstocks include whole and reduced petroleum crudes, atmospheric and vacuum residua, propane deasphalted residua, e.g., brightstock, cycle oils. FCC tower bottoms, gas oils, including atmospheric and vacuum gas oils and coker gas oils, light to heavy distillates including raw virgin distillates, hydrocrackates, hydrotreated oils, dewaxed oils, slack waxes, Fischer-Tropsch waxes, raffinates, and mixtures of these materials.

One way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at which 95 wt % of the feed will boil, while a "T99.5" boiling point is a temperature at which 99.5 wt % of the feed will boil.

Typical feeds include, for example, feeds with an initial boiling point of at least about 650° F. (343° C.), or at least about 700° F. (371° C.), or at least about 750° F. (399° C.). The amount of lower boiling point material in the feed may impact the total amount of diesel generated as a side product. Alternatively, a feed may be characterized using a T5 boiling point, such as a feed with a T5 boiling point of at least about 650° F. (343° C.), or at least about 700° F. (371° C.), or at least about 750° F. (399° C.). Typical feeds include, for example, feeds with a final boiling point of about 1150° F. (621° C.), or about 1100° F. (593° C.) or less, or about 1050° F. (566° C.) or less. Alternatively, a feed may be characterized using a T95 boiling point, such as a feed with a T95 boiling point of about 1150° F. (621° C.), or about 1100° F. (593° C.) or less, or about 1050° F. (566° C.) or less. It is noted that feeds with still lower initial boiling points and/or T5 boiling points may also be suitable for increasing the yield of premium diesel, so long as sufficient higher boiling material is available so that the overall nature of the process is a lubricant base oil production process. Feedstocks such as deasphalted oil with a final boiling point or a T95 boiling point of about 1150° F. (621° C.) or less may also be suitable.

In embodiments involving an initial sulfur removal stage prior to hydrocracking, the sulfur content of the feed can be at least 100 ppm by weight of sulfur, or at least 1000 wppm, or at least 2000 wppm, or at least 4000 wppm, or at least 20,000 wppm, or at least about 40,000 wppm. In other embodiments, including some embodiments where a previously hydrotreated and/or hydrocracked feed is used, the sulfur content can be about 2000 wppm or less, or about 1000 wppm or less, or about 500 wppm or less, or about 100 wppm or less.

In some embodiments, at least a portion of the feed can correspond to a feed derived from a biocomponent source. In this discussion, a biocomponent feedstock refers to a hydrocarbon feedstock derived from a biological raw material component, from biocomponent sources such as vegetable, animal, fish, and/or algae. Note that, for the purposes of this document, vegetable fats/oils refer generally to any plant based material, and can include flit/oils derived from a source such as plants of the genus *Jatropha*. Generally, the biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinofiagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui*, and *Chlamydomonas reinhardtii*.

The biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority greater than 50%) of the triglyceride present in the lipid material can be comprised of $C_{10}$ to $C_{26}$, for example $C_{12}$ to $C_{18}$, fatty acid constituents, based on total triglyceride present in the lipid material. Further, a triglyceride is a molecule having a structure substantially identical to the reaction product of glycerol and three fatty acids. Thus, although a triglyceride is described herein as being comprised of fatty acids, it should be understood that the fatty acid component does not necessarily contain a carboxylic acid hydrogen. Other types of feed that are derived from biological raw material components can include fatty acid esters, such as fatty acid alkyl esters (e.g., FAME and/or FAEE).

Biocomponent based feedstreams typically have relatively low nitrogen and sulfur contents. For example, a biocomponent based feedstream can contain up to about 500 wppm nitrogen, for example up to about 300 wppm nitrogen or up to about 100 wppm nitrogen. Instead of nitrogen and/or sulfur, the primary heteroatom component in biocomponent feeds is oxygen. Biocomponent diesel boiling range feedstreams, e.g., can include up to about 10 wt % oxygen, up to about 12 wt % oxygen, or up to about 14 wt % oxygen. Suitable biocomponent diesel boiling range feedstreams, prior to hydrotreatment, can include at least about 5 wt % oxygen, for example at least about 8 wt % oxygen.

Alternatively, a feed of biocomponent origin can be used that has been previously hydrotreated. This can be a hydrotreated vegetable oil feed, a hydrotreated fatty acid alkyl ester feed, or another type of hydrotreated biocomponent feed. A hydrotreated biocomponent feed can be a biocomponent feed that has been previously hydroprocessed to reduce the oxygen content of the feed to about 500 wppm or less, for example to about 200 wppm or less or to about 100 wppm or less. Correspondingly, a biocomponent feed can be hydrotreated to reduce the oxygen content of the feed, prior to other optional hydroprocessing, to about 500 wppm or less, for example to about 200 wppm or less or to about 100 wppm or less. Additionally or alternately, a biocomponent feed can be blended with a mineral feed, so that the blended feed can be tailored to have an oxygen content of about 500 wppm or less, for example about 200 wppm or less or about 100 wppm or less. In embodiments where at least a portion of the feed is of a biocomponent origin, that portion can be at least about 2 wt %, for example at least about 5 wt %, at least about 10 wt %, at least about 20 wt %, at least about 25 wt %, at least about 35 wt %, at least about 50 wt %, at least about 60 wt %, or at least about 75 wt %. Additionally or alternately, the biocomponent portion can be about 75 or less, for example about 60 wt % or less, about 50 wt % or less, about 35 wt % or less, about 25 wt % or less, about 20 wt % or less, about 10 wt % or less, or about 5 wt % or less.

The content of sulfur, nitrogen, and oxygen in a feedstock created by blending two or more feedstocks can typically be determined using a weighted average based on the blended feeds. For example, a mineral feed and a biocomponent feed can be blended in a ratio of about 80 wt % mineral feed and about 20 wt % biocomponent feed. In such a scenario, if the mineral feed has a sulfur content of about 1000 wppm, and the biocomponent feed has a sulfur content of about 10 wppm, the resulting blended feed could be expected to have a sulfur content of about 802 wppm.

Hydroprocessing for Lubricant Base Oil Production

In the discussion below, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

When a lubricant base oil product is desired, the lubricant base oil product can be further fractionated to form a plurality of products. For example, lubricant base oil products can be made corresponding to a 2 cSt cut, a 4 cSt cut, a 6 cSt cut, and/or a cut having a viscosity higher than 6 cSt. For example, a lubricant base oil product fraction having a viscosity of at least 2 cSt can be a fraction suitable for use in low pour point application such as transformer oils, low temperature hydraulic oils, or automatic transmission fluid. A lubricant base oil product fraction having a viscosity of at least 4 cSt can be a fraction having a controlled volatility and low pour point, such that the fraction is suitable for engine oils made according to SAE J300 in 0 W- or 5 W- or 10 W-grades. This fractionation can be performed at the time the diesel (or other fuel) product from the second stage is separated from the lubricant base oil product, or the fractionation can occur at a later time. Any hydrofinishing and/or aromatic saturation can occur either before or after fractionation. After fractionation, a lubricant base oil product fraction can be combined with appropriate additives for use as an engine oil or in another lubrication service.

Various types of hydroprocessing can be used in the production of lubricant base oils. Typical processes include a hydrocracking process to provide uplift in the viscosity index (VI) of the feed. The hydrocracked feed can then be dewaxed to improve cold flow properties, such as pour point or cloud point. The hydrocracked, dewaxed feed can then be hydrofinished, for example, to remove aromatics from the lubricant base oil product. This can be valuable for removing compounds that are considered hazardous under various regulations. In addition to the above, a preliminary hydrotreatment and/or hydrocracking stage can also be used for contaminant removal.

FIG. 1 shows a schematic example of a process train for producing lubricant oil base oils from a feed. In the embodiment shown in FIG. 1, a feedstock 102 is introduced into an optional preliminary hydrotreating and/or hydrocracking stage 110. This optional hydrotreating and/or hydrocracking stage can be used to reduce the amount of sulfur or nitrogen in the feed to a lower level. Removing sulfur and/or nitrogen from the feed can be beneficial for avoiding deactivation of hydrocracking catalyst in a later hydrocracking stage, such as hydrocracking stage 120. Alternatively, hydrocracking stage 120 may be able to provide sufficient contaminant removal preliminary hydrotreating or hydrocracking stage 110 is not necessary. A gas-liquid separator 114 or 124 is shown after both stage 110 and stage 120. The separators are also optional, depending on the desired configuration. At some point in the reaction system, removal of gas phase $H_2S$ or $NH_3$ is typically beneficial to avoid poisoning of downstream catalysts. Thus, at least one separator will typically be present prior to introducing a hydrocracked effluent into a dewaxing stage.

In the embodiment shown in FIG. 1, hydrocracking stage 120 receives the hydrotreated and/or hydrocracked effluent 115 from stage 110, possibly after passing through separator 114, Alternatively, feedstock 102 may enter hydrocracking stage 120 directly, such as by being passed into hydrocracking stage 120 as the output from a fractionator, vacuum distillation unit, or some other refinery process. Hydrocracking stage 120 can be operated under effective conditions for improving the VI of the feed to a desired level, as well as performing any additional contaminant removal.

After exiting hydrocracking stage 120, the (optionally separated) effluent 125 is passed into a dewaxing stage 130 in order to improve cold flow properties of the hydrocracked effluent. The hydrocracked, dewaxed effluent 135 is then passed into hydrofinishing stage 140. The resulting effluent 145 can then be fractionated 150 to form various desired fractions, such as one or more lubricant based stock fractions 157 and 158. Additionally, fractionator 150 can also generate multiple fuel fractions, such as a naphtha fraction 152, a premium diesel or distillate fraction 154, and an additional diesel fraction 155. A light ends fraction 151 will also typically be removed from fractionator 150. More or different fractions can be generated by selecting different cut points in the fractionator.

Figure 2:
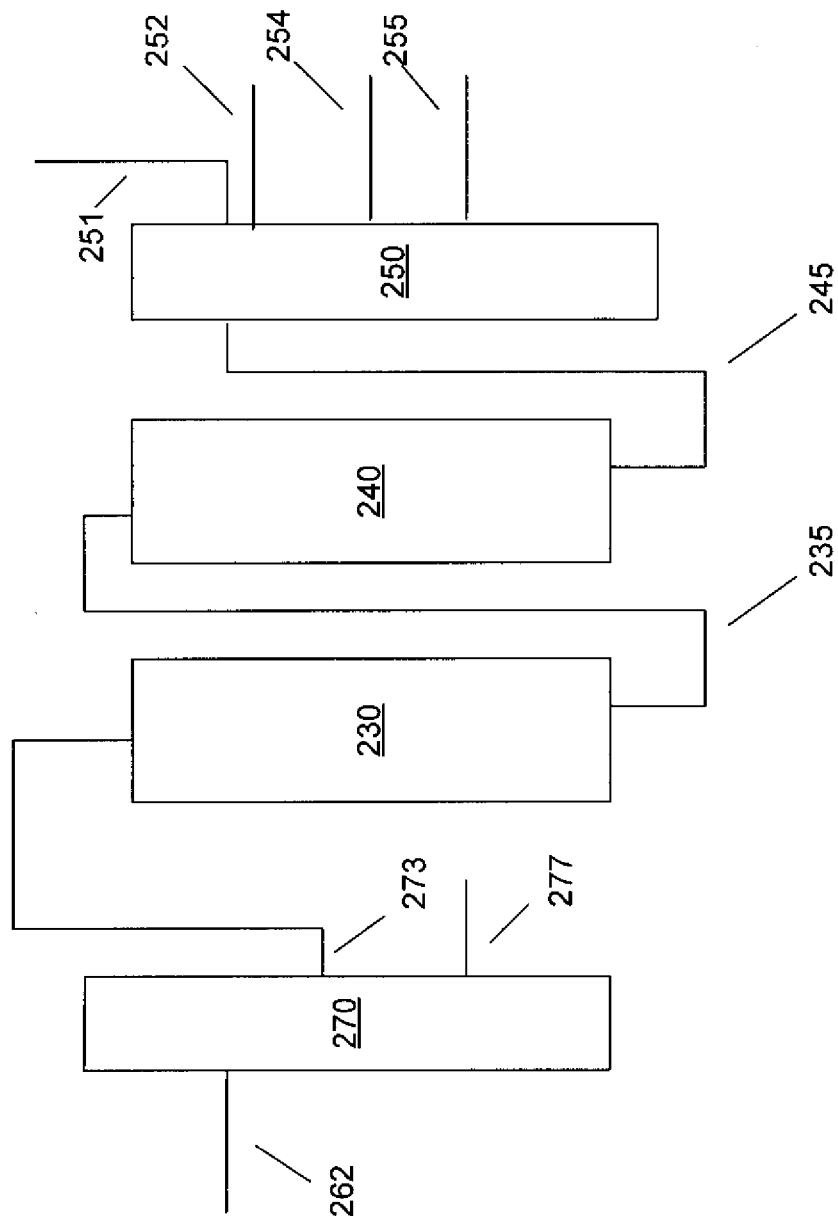
FIG. 2 schematically shows an example of another multi-stage reaction system according to an embodiment of the invention.

FIG. 2 shows an alternative configuration for processing a fuels fraction of an output from a lubricant base oil production process. In this type of configuration, a feed is hydrocracked under conditions suitable for lubricant base oil production. However, prior to performing the final dewaxing and hydrofinishing stages, the hydrocracked effluent is fractionated. This results in using separate dewaxing and hydrofinishing stages for the fuels and lubricant base oil fractions of the hydrocracked effluent. In FIG. 2, a fractionator 270, such as a vacuum fractionation unit, receives an output effluent 262 from the final hydrocracking stage of lubricant base oil production process. Optionally, the output effluent 262 can also be subject to some amount of catalytic dewaxing and/or hydrofinishing prior to entering fractionator 270. The output effluent 262 is then fractionated in fractionator 270 to form at least a fuels fraction 273 and a lubricant base oil fraction 277. The lubricant base oil fraction can undergo further processing to meet a desired base oil specification. The fuels fraction 273 is then passed into a catalytic dewaxing stage 230 in order to improve cold flow properties of the hydrocracked effluent. The dewaxed effluent 235 is then passed into a hydrofinishing stage 240. The resulting effluent 245 can then be fractionated 250 to form various desired fractions. Since the lubricant base oil fraction was separated out in fractionator 270, fractionation 250 can be performed using an atmospheric fractionation unit or a vacuum fractionation unit. Fractionator 250 can also generate multiple fuel fractions, such as a naphtha fraction 252, a premium diesel or distillate fraction 254, and an additional diesel fraction 255. Optionally, a light ends fraction 251 may also be removed from fractionator 250, More or different fractions can be generated by selecting different cut points in the fractionator.

Production of Lubricant Base Oils Versus Production of Fuels

A fuels production process can be distinguished from a lubricant base oil or basestock production process in various ways. One typical distinction is the amount of feed conversion. When fuels are produced from a feedstock that has a substantial portion of material that boils at about 700° F. (371° C.) or above, the goal of the fuels production process is to convert the feed to lower boiling compounds (boiling below about 371° C.) that match the boiling range of the desired fuel product. By contrast, in lubricant base oil production, conversion of the feed is performed in order to increase the viscosity index (VI) to a desired level for the product. This conversion of feed can be achieved by hydroprocessing over a variety of catalyst types. However, the largest conversion percentages typically occur when the hydroprocessing corresponds to exposing the feed to a hydrocracking catalyst under effective hydrocracking conditions.

Another factor in processing a feed is the presence of contaminants in the feed, such as sulfur, nitrogen, or (particularly in the case of a feed with biocomponent origin) oxygen. In some fuels and/or lubricant base oil processing schemes, removal of contaminants is performed during a hydrocracking stage. This may be a hydrocracking stage that also performs a desired level of conversion, or it can be a preliminary hydrocracking stage designed for contaminant removal, so that a later hydrocracking stage can perform a more efficient conversion of the feed. Alternatively, a hydrotreating stage may be used for contaminant removal. It is noted that a severe hydrotreating stage and a mild hydrocracking stage may have similar process conditions and use similar catalyst types. Removal of contaminants from a feed usually also results in at least some conversion of the feed to lower boiling molecules or compounds.

In this document, hydroprocessing for fuels production is distinguished from hydroprocessing for lubricant base oil production based on the amount of feed conversion that occurs for a feed at a specified sulfur content or less. The amount of conversion is based on conversion of molecules boiling at about 700° F. (371° C.) or above to molecules boiling at less than about 700° F. (371° C.). In various embodiments, this measure of conversion is used for feedstocks that contain at least a majority of molecules that boil above 700° F. (371° C.) during processing that is designed, to the degree that it is possible, to maintain the molecules that boil above 700° F. while still achieving desired lubricant base oil properties. The sulfur level can be any convenient sulfur level. For example, consider a feed with an initial sulfur level of 40,000 wppm. An initial hydrotreating stage can be used to reduce the sulfur level to 2,000 wppm. In this situation, one option for defining the amount of conversion could be to measure the amount of conversion relative to the initial feed with 40,000 wppm of sulfur. Another option could be to define conversion based on the hydrotreated feed that has 2,000 wppm of sulfur. In this latter option, although some feed conversion may have occurred in lowering the sulfur from 40,000 wppm to 2,000 wppm, that conversion would not be counted in measuring the conversion of the feed. Instead, only conversion occurring on the feed with 2,000 wppm or less of sulfur would be counted toward the total amount of conversion.

In various embodiments, a lubricant base oil production process can have 45% or less conversion of molecules with a boiling point above 700° F. (371° C.) to lower boiling molecules, or 40% or less conversion, or 35% or less conversion. These levels of conversion indicate a preference for forming a large portion (preferably a majority) of lubricant base oil as a product. Processes with larger amounts of conversion represent fuels production processes, as a large portion (preferably a majority) of the resulting products will have a boiling range corresponding to a fuel. It is noted that fuels production processes are capable of producing small amounts of residual streams that are suitable for further processing to form a lubricant base oil type product. However, the lower boiling fuel products, such as naphtha or diesel, represent the majority by weight of the products produced from a fuels production process.

In various embodiments, the amount of conversion of the feed can be based on the amount of conversion that occurs when the sulfur level of the feed is 2000 wppm or less, or 1000 wppm or less, or 500 wppm or less, or 100 wppm or less. Note that at these lower levels of sulfur content, some or all conversion that occurs in a preliminary hydrotreatment/hydrocracking stage for a high sulfur feed may not be included in the amount of conversion used to define the process as a lubricant base oil production process. Alternatively, if it is desirable to characterize the conversion for a feed with a higher level of contaminants, the amount of conversion of the feed can be based on the amount of conversion that occurs when the sulfur level is 20,000 wppm or less, or 10,000 wppm or less, or 4000 wppm or less.

It is noted that most or substantially all of the feed conversion is likely to take place within a hydrocracking stage or a hydrotreating stage. Many types of dewaxing stages and hydrofinishing stages will result in little or no feed conversion. If desired, the characterization of the amount of conversion in the lubricant base oil production process may be limited to only conversion occurring within hydrocracking and/or hydrotreating stages, such as hydrocracking and/or hydrotreating stages at a specified sulfur level or less. This type of definition may be particularly useful in embodiments such as the embodiment shown in FIG. 2, where the final dewaxing and hydrofinishing stages are performed separately on the fuels and lubricant base oil fractions.

Hydrotreatment Conditions

Hydrotreatment is typically used to reduce the sulfur, nitrogen, and aromatic content of a feed. Hydrotreating conditions can include temperatures of 200° C. to 450° C., or 315° C. to 425° C.; pressures of 250 psig (1.8 MPa) to 5000 psig (34.6 MPa) or 300 psig (2.1 MPa) to 3000 psig (20.8 MPa); Liquid Hourly Space Velocities (LHSV) of 0.2-10 $h^{-1}$; and hydrogen treat rates of 200 scf/B (35.6 $m^3/m^3$) to 10,000 scf/B (1781 $m^3/m^3$), or 500 (89 $m^3/m^3$) to 10,000 scf/B (1781 $m^3/m^3$).

Hydrotreating catalysts are typically those containing Group VIB metals, such as molybdenum and/or tungsten, and non-noble Group VIII metals, such as, iron, cobalt and nickel and mixtures thereof. These metals or mixtures of metals are typically present as oxides or sulfides on refractory metal oxide supports. Suitable metal oxide supports include low acidic oxides such as silica, alumina or titania. Preferred aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 11.0 $cm^3/g$, or 0.35 to 0.8 $cm^3/g$. The supports are preferably not promoted with a halogen such as fluorine as this generally increases the acidity of the support. Preferred metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina.

Alternatively, the hydrotreating catalyst can be a bulk metal catalyst, or a combination of stacked beds of supported and bulk metal catalyst. By bulk metal, it is meant that the catalysts are unsupported wherein the bulk catalyst particles comprise 30-100 wt % of at least one Group VIII non-noble metal and at least one Group VIB metal, based on the total weight of the bulk catalyst particles, calculated as metal oxides and wherein the bulk catalyst particles have a surface area of at least 10 $m^2/g$. It is furthermore preferred that the bulk metal hydrotreating catalysts used herein comprise about 50 to about 100 wt %, and even more preferably about 70 to about 100 wt %, of at least one Group VIII non-noble metal and at least one Group VIB metal, based on the total weight of the particles, calculated as metal oxides. The amount of Group VIB and Group VIII non-noble metals can easily be determined VIB TEM-EDX.

Bulk catalyst compositions comprising one Group VIII non-noble metal and two Group VIB metals are preferred. It has been found that in this case, the bulk catalyst particles are sintering-resistant. Thus the active surface area of the bulk catalyst particles is maintained during use. The molar ratio of Group VIB to Group VIII non-noble metals ranges generally from 10:1-1:10 and preferably from 3:1-1:3. In the case of a core-shell structured particle, these ratios of course apply to the metals contained in the shell. If more than one Group VIB metal is contained in the bulk catalyst particles, the ratio of the different Group VIB metals is generally not critical. The same holds when more than one Group VIII non-noble metal is applied. In the case where molybdenum and tungsten are present as Group VIB metals, the molybenum:tungsten ratio preferably lies in the range of 9:1-1:9. Preferably the Group VIII non-noble metal comprises nickel and/or cobalt. It is further preferred that the Group VIB metal comprises a combination of molybdenum and tungsten. Preferably, combinations of nickel/molybdenum/tungsten and cobalt/molybdenum/tungsten and nickel/cobalt/molybdenum/tungsten are used. These types of precipitates appear to be sinter-resistant. Thus, the active surface area of the precipitate is maintained during use. The metals are preferably present as oxidic compounds of the corresponding metals, or if the catalyst composition has been sulfided, sulfidic compounds of the corresponding metals.

It is also preferred that the bulk metal hydrotreating catalysts used herein have a surface area of at least 50 $m^2/g$ and more preferably of at least 100 $m^2/g$. It is also desired that the pore size distribution of the bulk metal hydrotreating catalysts be approximately the same as the one of conventional hydrotreating catalysts, Bulk metal hydrotreating catalysts have a pore volume of 0.05-5 ml/g, or of 0.1-4 ml/g, or of 0.1-3 ml/g, or of 0.1-2 ml/g, determined by nitrogen adsorption. Preferably, pores smaller than 1 nm are not present. The bulk metal hydrotreating catalysts can have a median diameter of at least 50 nm, or at least 100 nm. The bulk metal hydrotreating catalysts can have a median diameter of not more than 5000 µm, or not more than 3000 µm. In an embodiment, the median particle diameter lies in the range of 0, 1-50 µm and most preferably in the range of 0.5-50 µm.

Optionally, one or more beds of hydrotreatment ent catalyst can be located downstream from a hydrocracking catalyst bed and/or a dewaxing catalyst bed in the first stage. For these optional beds of hydrotreatment catalyst, the hydrotreatment conditions can be selected to be similar to the conditions above, or the conditions can be selected independently.

Hydrocracking Conditions

Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Non-limiting examples of metals for hydrocracking catalysts include nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various embodiments, the conditions selected for hydrocracking for lubricant base oil production can depend on the desired level of conversion, the level of contaminants in the input feed to the hydrocracking stage, and potentially other factors. A hydrocracking process performed under sour conditions, such as conditions where the sulfur content of the input feed to the hydrocracking stage is at least 500 wppm, can be carried out at temperatures of about 550° F. (288° C.) to about 840° F. (449° C.), hydrogen partial pressures of from about 250 psig to about 5000 psig (1.8 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of about 600° F. (343° C.) to about 815° F. (435° C.), hydrogen partial pressures of from about 500 psig to about 3000 psig (3.5 MPag-20.9 MPag), liquid hourly space velocities of from about 0.2 h$^{-1}$ to about 2 h$^{-1}$ and hydrogen treat gas rates of from about 213 m$^3$/m$^3$ to about 1068 m$^3$/m$^3$ (1200 SCF/B to 6000 SCF/B).

A hydrocracking process performed under non-sour conditions can be performed under conditions similar to those used for a first stage hydrocracking process, or the conditions can be different. Alternatively, a non-sour hydrocracking stage can have less severe conditions than a similar hydrocracking stage operating under sour conditions. Suitable hydrocracking conditions can include temperatures of about 550° F. (288° C.) to about 840° F. (449° C.), hydrogen partial pressures of from about 250 psig to about 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of about 600° F. (343° C.) to about 815° F. (435° C.), hydrogen partial pressures of from about 500 psig to about 3000 psig MPag-20.9 MPag), liquid hourly space velocities of from about 0.2 h$^{-1}$ to about 2 h$^{-1}$ and hydrogen treat gas rates of from about 213 m$^3$/m$^3$ to about 11068 m$^3$/m$^3$ (1200 SCF/B to 6000 SCF/B). In some embodiments, multiple hydrocracking stages may be present, with a first hydrocracking stage operating under sour conditions, while a second hydrocracking stage operates under non-sour conditions and/or under conditions where the sulfur level is substantially reduced relative to the first hydrocracking stage. In such embodiments, the temperature in the second stage hydrocracking process can be about 40° F. (22° C.) less than the temperature for a hydrocracking process in the first stage, or about 80° F. (44° C.) less, or about 120° F. (66° C.) less. The pressure for the second stage hydrocracking process can be 100 psig (690 kPa) less than a hydrocracking process in the first stage, or 200 psig (1380 kPa) less, or 300 psig (2070 kPa) less.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

Dewaxing Process

In various embodiments, a dewaxing catalyst is also included. Typically, the dewaxing catalyst is located in a bed downstream from any hydrocracking catalyst stages and/or any hydrocracking catalyst present in a stage. This can allow the dewaxing to occur on molecules that have already been hydrotreated or hydrocracked to remove a significant fraction of organic sulfur- and nitrogen-containing species. The dewaxing catalyst can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst.

Suitable dewaxing catalysts can include molecular sieves such as crystalline aluminosilicates (zeolites). In an embodiment, the molecular sieve can comprise, consist essentially of, or be ZSM-5, ZSM-22, ZSM-23, ZSM-35, ZSM-48, zeolite Beta, or a combination thereof, for example ZSM-23 and/or ZSM-48, or ZSM-48 and/or zeolite Beta. Optionally but preferably, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22. Preferred materials are EU-2, EU-11, ZBM-30, ZSM-48, or ZSM-23. ZSM-48 is most preferred. Note that a zeolite having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23. Optionally but preferably, the dewaxing catalyst can include a binder for the molecular sieve, such as alumina, titania, silica, silica-alumina, zirconia, or a combination thereof for example alumina and/or titania or silica and/or zirconia and/or titania.

Preferably, the dewaxing catalysts used in processes according to the invention are catalysts with a low ratio of silica to alumina. For example, for ZSM-48, the ratio of silica to alumina in the zeolite can be less than 200:1, or less than 110:1, or less than 100:1, or less than 90:1, or less than 80:1. In various embodiments, the ratio of silica to alumina can be from 30:1 to 200:1, 60:1 to 110:1, or 70:1 to 100:1.

In various embodiments, the catalysts according to the invention further include a metal hydrogenation component. The metal hydrogenation component is typically a Group VI and/or a Group VIII metal. Preferably, the metal hydrogenation component is a Group VIII noble metal. Preferably, the metal hydrogenation component is Pt, Pd, or a mixture thereof. In an alternative preferred embodiment, the metal hydrogenation component can be a combination of a non-noble Group VIII metal with a Group VI metal. Suitable combinations can include Ni, Co, or Fe with Mo or V, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For embodiments where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the invention can also include a binder. In some embodiments, the dewaxing catalysts used in process according to the invention are formulated using a low surface area binder, a low surface area binder represents a binder with a surface area of 100 m$^2$/g or less, or 80 m$^2$/g or less, or 70 m$^2$/g or less.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

In yet another embodiment, a binder composed of two or more metal oxides can also be used. In such an embodiment, the weight percentage of the low surface area binder is preferably greater than the weight percentage of the higher surface area binder. Alternatively, if both metal oxides used for forming a mixed metal oxide binder have a sufficiently low surface area, the proportions of each metal oxide in the binder are less important. When two or more metal oxides are used to form a binder, the two metal oxides can be incorporated into the catalyst by any convenient method. For example, one binder can be mixed with the zeolite during formation of the zeolite powder, such as during spray drying. The spray dried zeolite/binder powder can then be mixed with the second metal oxide binder prior to extrusion. In yet another embodiment, the dewaxing catalyst is self-bound and does not contain a binder.

A bound dewaxing catalyst can also be characterized by comparing the micropore (or zeolite) surface area of the catalyst with the total surface area of the catalyst. These surface areas can be calculated based on analysis of nitrogen porosimetry data using the BET method thr surface area measurement. Previous work has shown that the amount of zeolite content versus binder content in catalyst can be determined from BET measurements (see, e.g. Johnson, M. F. L., *Jour. Catal.*, (1978) 52, 425). The micropore surface area of a catalyst refers to the amount of catalyst surface area provided due to the molecular sieve and/or the pores in the catalyst in the BET measurements. The total surface area represents the micropore surface plus the external surface area of the bound catalyst. In one embodiment, the percentage of micropore surface area relative to the total surface area of a bound catalyst can be at least about 35%, for example at least about 38%, at least about 40%, or at least about 45%. Additionally or alternately, the percentage of micropore surface area relative to total surface area can be about 65% or less, for example about 60% or less, about 55% or less, or about 50% or less.

Additionally or alternately, the dewaxing catalyst can comprise, consist essentially of or be a catalyst that has not been dealuminated. Further additionally or alternately, the binder for the catalyst can include a mixture of binder materials containing alumina.

Process conditions in a catalytic dewaxing zone in a sour environment can include a temperature of from 200 to 150° C. preferably 270 to 400° C., a hydrogen partial pressure of from 1.8 to 34.6 mPa (250 to 5000 psi), preferably 4.8 to 20.8 mPa, a liquid hourly space velocity of from 0.2 to 10 v/v/hr, preferably 0.5 to 3.0, and a hydrogen circulation rate of from 35.6 to 1781 m$^3$/m$^3$ (200 to 10,000 scf/B), preferably 178 to 890.6 m$^3$/m$^3$ (1000 to 5000 scf/B). In still other embodiments, the conditions can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 m$^3$/m$^3$ to about 1068 m$^3$/m$^3$ (1200 SCF/B to 6000 SCF/B). These latter conditions may be suitable, for example, if the dewaxing stage is operating under sour conditions.

Additionally or alternately, the conditions for dewaxing can be selected based on the conditions for a preeceding reaction in the stage, such as hydrocracking conditions or hydrotreating conditions. Such conditions can be further modified using a quench between previous catalyst bed(s) and the bed for the dewaxing catalyst. Instead of operating the dewaxing process at a temperature corresponding to the exit temperature of the prior catalyst bed, a quench can be used to reduce the temperature for the hydrocarbon stream at the beginning of the dewaxing catalyst bed. One option can be to use a quench to have a temperature at the beginning of the dewaxing catalyst bed that is about the same as the outlet temperature of the prior catalyst bed. Another option can be to use a quench to have a temperature at the beginning of the dewaxing catalyst bed that is at least about 10° F. (6° C.) lower than the prior catalyst bed, or at least about 20° F. (11° C.) lower, or at least about 30° F. (16° C.) lower, or at least about 40° F. (21° C.) lower.

Hydrofinishing and/or Aromatic Saturation Process

In various embodiments, a hydrofinishing and/or aromatic saturation stage is also be provided. The hydrofinishing and/or aromatic saturation can occur after the last hydrocracking or dewaxing stage. The hydrofinishing and/or aromatic saturation can occur either before or after fractionation. If hydrofinishing and/or aromatic saturation occurs after fractionation, the hydrofinishing can be performed on one or more portions of the fractionated product, such as being performed on one or more lubricant base oil portions. Alternatively, the entire effluent from the last hydrocracking or dewaxing process can be hydrofinished and/or undergo aromatic saturation.

In some situations, a hydrofinishing process and an aromatic saturation process can refer to a single process performed using the same catalyst. Alternatively, one type of catalyst or catalyst system can be provided to perform aromatic saturation, while a second catalyst or catalyst system can be used for hydrofinishing. Typically a hydrofinishing and/or aromatic saturation process will be performed in a separate reactor from dewaxing or hydrocracking processes for practical reasons, such as facilitating use of a lower temperature for the hydrofinishing or aromatic saturation process. However, an additional hydrofinishing reactor following a hydrocracking or dewaxing process but prior to fractionation could still be considered part of a second stage of a reaction system conceptually.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is about 30 wt % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as about 20 wt % for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and polynuclear aromatic reduction.

Hydrofinishing conditions can include temperatures from about 125° C. to about 425° C., preferably about 180° C. to about 280° C., total pressures from about 500 psig (3.4 MPa) to about 3000 psig (20.7 MPa), preferably about 1500 psig (10.3 MPa) to about 2500 psig (17.2 MPa), and liquid hourly space velocity from about 0.1 hr$^{-1}$ to about 5 hr$^{-1}$ LHSV, preferably about 0.5 hr$^{-1}$ to about 1.5 hr$^{-1}$.

Example 1

Fractionation of a Medium Blend Stock

In this example, a desired lubricant base oil and a premium diesel fraction were formed according to an embodiment of the invention. A medium blend stock was formed by processing a feedstock using a lubricant base oil production process involving hydrocracking, dewaxing, and hydrofinishing. The medium blend stock, corresponding to a total liquid effluent from the lubricant base oil production process, had a pour point of −24° C. The temperature at which 99.5 wt % of the medium blend stock boiled off (T99.5) was about 1000° F. (538° C.). The density of the medium blend stock at 70° C. was 0.8092 g/cm$^3$ while the density at 15° C. was 0.8444 g/cm$^3$. In the table, the "yield" for the medium blend stock is shown as 100%, to reflect the fact that the medium blend stock is being fractionated to form the other cuts shown in the table. Additionally, the molar average boiling point for the medium blend stock was about 398° C.

The processing conditions for forming the medium blend stock were selected so that, after fractionation, a desired lubricant base oil was produced having a Noack volatility of 6.3 wt %; a viscosity at 100° C. of about 6.1 cSt; and a pour point of −18° C. The density of the desired lubricant base oil at 100° C. was 0.7991 g/cm$^3$. The yield of the desired lubricant base oil from fractionation was about 64 wt % of the medium blend stock.

In addition to the desired lubricant base oil, a premium diesel fraction was also formed during fractionation according to an embodiment of the invention. FIG. 3 provides a table showing the fractionation of the medium blend stock. The first column of the table shows data corresponding to the medium blend stock. The remaining columns correspond to the various fractions formed from the medium blend stock. In the fractionation shown in FIG. 3, the fractions formed were one naphtha fraction, a premium diesel fraction according to the invention, four additional diesel or distillate fractions, and the desired lubricant base oil fraction.

FIG. 3 shows various properties of the premium diesel fraction that was generated in relation to the other fractions and in relation to the medium blend stock. The yield of the premium diesel fraction was approximately 22 wt % relative to the medium blend stock (i.e., total liquid effluent). The yield of the lubricant base oil was about 64 wt %, while the yield of the remaining naphtha and diesel fractions combined was about 14 wt %. The presence of 64 wt % of lubricant base oil as a product clearly indicates that the medium blend stock was formed using a lubricant base oil production process, as opposed to a fuels production process. Relative to the total weight of the fuels fraction, the premium diesel fraction corresponded to 22/36 or about 61% of the fuels fraction.

It is noted that the density of the premium diesel fraction was lower than the density of the medium blend stock that was fractionated to form the premium diesel fraction. For example, the density of the premium diesel fraction at 70° C. was 0.7956 g/cm$^3$ while the density of the medium blend stock at 70° C. was 0.8092. This is in contrast to the other diesel fractions generated, which had a higher density than the density of the medium blend stock. In particular, the next lowest boiling diesel fraction, which contained about 20%-25% of the weight relative to the weight premium diesel fraction, had a density at 70° C. greater than the density of the medium blend stock (calculated density of 0.8146 for Cut 3 versus measured density of 0.8092 for the medium blend stock).

As shown in FIG. 3, the premium diesel fraction had various beneficial properties. The pour point of the premium diesel fraction was −51° C., while the cloud point was −36° C. The cetane number, derived according to ASTM method D6890, was 60.2. The sulfur content of the premium diesel fraction was 0.12 wppm, while the aromatics content was less than 1 wt %.

Example 2

Fractionation of a Light Blend Stock

FIG. 4 shows another example of generating both a desired lubricant base oil and a premium diesel fraction according to the invention. A light blend stock was formed by processing a feedstock using a lubricant base oil production process involving hydrocracking, dewaxing, and hydrofinishing. The light blend stock, corresponding to a total liquid effluent from the lubricant base oil production process, had a pour point of −0.26° C. The temperature at which 99.5 wt % of the light blend stock boiled off (T99.5) was about 875° F. (469° C.). The density of the light blend stock at 70° C. was 0.7985 g/cm$^3$ while the density at 15° C. was 0.8343 g/cm$^3$. In the table, the "yield" for the light blend stock is shown as 100%, to reflect the fact that the light blend stock is being fractionated to form the other cuts shown in the table. Additionally, the molar average boiling point for the light blend stock was about 368° C.

The processing conditions for forming the light blend stock were selected so that, after fractionation, a desired lubricant base oil was produced having a Noack volatility of 15.7 wt %; a viscosity at 100° C. of about 4.3 cSt; and a pour point of −20° C. The density of the desired lubricant base oil at 100° C. was 0.7873 g/cm$^3$. The yield of the desired lubricant base oil from fractionation was about 52 wt % of the light blend stock.

In addition to the desired lubricant base oil, a premium diesel fraction was also formed during fractionation according to an embodiment of the invention. FIG. 4 provides a table showing the fractionation of the light blend stock. The first column of the table shows data corresponding to the light blend stock. The remaining columns correspond to the various fractions formed from the light blend stock. In the fractionation shown in FIG. 4, the fractions formed were one naphtha fraction, a premium diesel fraction according to the invention, four additional diesel or distillate fractions, and the desired lubricant base oil fraction.

FIG. 4 shows various properties of the premium diesel fraction that was generated in relation to the other fractions and in relation to the light blend stock. The yield of the premium diesel fraction was approximately 30 wt % relative to the light blend stock (i.e., total liquid effluent). The yield of the lubricant base oil was about 52 wt %, while the yield of the remaining naphtha and diesel fractions combined was about 18 wt %. The presence of 52 wt % of lubricant base oil as a product clearly indicates that the light blend stock was formed using a lubricant base oil production process, as opposed to a fuels production process. Relative to the total weight of the fuels fraction, the premium diesel fraction corresponded to 30/48 or about 62.5% of the fuels fraction.

It is noted that the density of the premium diesel fraction was lower than the density of the light blend stock that was fractionated to form the premium diesel fraction. For example, the density of the premium diesel fraction at 70° C. was 0.7930 g/cm³ while the density of the light blend stock at 70° C. was 0.7985. This is in contrast to the other diesel fractions generated, which had a higher density than the density of the light blend stock. In particular, the next lowest boiling diesel fraction, which contained about 25%-30% of the weight relative to the weight premium diesel fraction, had a density at 70° C. greater than the density of the light blend stock (calculated density of 0.8013 for Cut 3 versus measured density of 0.7985 for the light blend stock). As shown in FIG. 4, the premium diesel fraction had various beneficial properties. The pour point of the premium diesel fraction was −53° C., while the cloud point was about −34° C. The cetane number, derived according to ASTM method D6890, was 61.3. The sulfur content of the premium diesel fraction was 0.08 wppm, while the aromatics content was less than 1 wt %.

ADDITIONAL EMBODIMENTS

Embodiment 1

A method for producing a diesel fraction and a lubricant base oil, comprising: contacting a feedstock having a T5 boiling point of at least about 650° F. (343° C.) with a hydrocracking catalyst under effective hydrocracking conditions for lubricant base oil production to produce a hydrocracked effluent; dewaxing the hydrocracked effluent under effective catalytic dewaxing conditions in the presence of a dewaxing catalyst; and fractionating the hydrofinished effluent to produce at least a naphtha product fraction, a first diesel fraction, a second diesel fraction having a higher cut point temperature than a cut point temperature for the first diesel fraction, and a lubricant base oil fraction, the lubricant base oil fraction comprising at least about 50 wt % of the hydrocracked, dewaxed effluent.

Embodiment 2

The method according to embodiment 1, wherein the first diesel fraction has a pour point of about −40° C. or less, a cetane number of at least about 55, and a sulfur content of less than about 1 wppm.

Embodiment 3

The method of embodiment 1 or 2, wherein a density at a first temperature of the first diesel fraction is less than a density at the first temperature of the hydrocracked, dewaxed effluent.

Embodiment 4

The method of any of the above embodiments, wherein the first diesel fraction comprises at least about 20 wt % of the hydrocracked, dewaxed effluent.

Embodiment 5

The method of any of the above embodiments, wherein the second diesel fraction comprises at least about 20 wt % of a weight of the first diesel fraction, a density of the second diesel fraction at the first temperature being greater than the density at the first temperature of the hydrocracked, dewaxed effluent.

Embodiment 6

The method of any of the above embodiments, further comprising hydrofinishing the hydrocracked dewaxed effluent prior to said fractionating.

Embodiment 7

The method of any of the above embodiments, wherein a temperature at which 99.5 wt % of the first diesel fraction boils (T99.5 boiling point) is about 400° C. or less.

Embodiment 8

The method of any of the above embodiments, wherein the contacting of the feedstock under effective hydrocracking conditions converts 45% or less of the molecules boiling at 700° F. (371° C.) or more in the feedstock to molecules boiling at less than 700° F. (371° C.).

Embodiment 9

The method of any of the above embodiments, further comprising hydrotreating the feedstock prior to contacting the feedstock with the hydrocracking catalyst.

Embodiment 10

The method of embodiment 9, wherein hydrotreating the feedstock and contacting of the feedstock under the effective hydrocracking conditions, in combination, converts 45% or less of the molecules boiling at 700° F. (371° C.) or more in the feedstock to molecules boiling at less than 700° F. (371° C.).

Embodiment 11

The method of any of the above embodiments, wherein the first diesel fraction has a cloud point of about −25° C. or less and has an aromatics content of less than about 1.0 wt %.

Embodiment 12

The method of any of the above embodiments, wherein the lubricant base oil fraction comprises at least about 60 wt % of the hydrofinished effluent.

Embodiment 13

The method of any of the above embodiments, wherein the first diesel fraction comprises at least about 50 wt % of fuels fractions formed during said fractionating.

Embodiment 14

The method of any of the above embodiments, further comprising: dewaxing the lubricant boiling range fraction under second effective catalytic dewaxing conditions in the presence of a dewaxing catalyst; and hydrofinishing the dewaxed lubricant boiling range fraction under second effective hydrofinishing conditions in the presence of a hydrofinishing catalyst to form a lubricant base oil.

Embodiment 15

The method of embodiment 14, wherein the second effective catalytic dewaxing conditions are the same as the first catalytic dewaxing conditions.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

What is claimed is:

1. A method for producing a diesel fraction and a lubricant base oil, comprising:

contacting a feedstock having a T5 boiling point of at least about 650° F. (343° C.) and a sulfur content of about 2000 wppm or less with a hydrocracking catalyst under effective hydrocracking conditions for lubricant base oil production to produce a hydrocracked effluent, the effective hydrocracking conditions comprising a temperature of about 288° C. to about 449° C., a hydrogen partial pressure of about 250 psig to about 5000 psig, a liquid hourly space velocity of about 0.05 h$^{-1}$ to about 10 h$^{-1}$, and a hydrogen treat gas rate of about 200 SCF/B to about 10000 SCF/B;

dewaxing the hydrocracked effluent under effective catalytic dewaxing conditions in the presence of a dewaxing catalyst, the effective catalytic dewaxing conditions comprising a temperature of about 550° F. to about 840° F., a hydrogen partial pressure of about 250 psig to about 5000 psig, a liquid hourly space velocity of about 0.2 h$^{-1}$ to about 10 h$^{-1}$, and a hydrogen treat gas rate of about 200 SCF/B to about 10000 SCF/B;

hydrofinishing the hydrocracked, dewaxed effluent under effective hydrofinshing conditions in the presence of a hydrofinishing catalyst, the hydrofinishing catalyst comprising at least one metal on a support, the at least one metal consisting essentially of a Group VIII metal, the effective hydrofinishing conditions comprising a temperature of about 125° C. to about 425° C., a hydrogen partial pressure of about 500 psig to about 3000 psig, and a liquid hourly space velocity of about 0.1 h$^{-1}$ to about 5 h$^{-1}$, the conversion of the feedstock during the contacting the feedstock with the hydrocracking catalyst, the dewaxing of the hydrocracked effluent, and the hydrofinishing the hydrocracked, dewaxed effluent being about 45% or less relative to a conversion temperature of 700° F.; and fractionating the hydrofinished effluent to produce at least a naphtha product fraction, a first diesel fraction, a second diesel fraction having a higher cut point temperature than a cut point temperature for the first diesel fraction, and a lubricant base oil fraction, the lubricant base oil fraction comprising at least about 50 wt % of the hydrofinished effluent, the first diesel fraction having a pour point of about −40° C. or less, a cetane number of at least about 55, and a sulfur content of less than about 1 wppm, wherein a density at a first temperature of the first diesel fraction is less than a density at the first temperature of the hydrofinished effluent, the second diesel fraction having a density at the first temperature that is greater than the density at the first temperature of the hydrofinished effluent.

2. The method of claim 1, wherein the first diesel fraction comprises at least about 20 wt % of the hydrofinished effluent.

3. The method of claim 2, wherein the second diesel fraction comprises at least about 20 wt % of a weight of the first diesel fraction, a density of the second diesel fraction at the first temperature being greater than the density at the first temperature of the hydrofinished effluent.

4. The method of claim 1, wherein a temperature at which 99.5 wt % of the first diesel fraction boils (T99.5 boiling point) is about 400° C. or less.

5. The method of claim 1, wherein the contacting of the feedstock under effective hydrocracking conditions converts 45% or less of the molecules boiling at 700° F. (371° C.) or more in the feedstock to molecules boiling at less than 700° F. (371° C.).

6. The method of claim 1, further comprising hydrotreating the feedstock prior to contacting the feedstock with the hydrocracking catalyst.

7. The method of claim 6, wherein hydrotreating the feedstock and contacting of the feedstock under the effective hydrocracking conditions, in combination, converts 45% or less of the molecules boiling at 700° F. (371° C.) or more in the feedstock to molecules boiling at less than 700° F. (371° C.).

8. The method of claim 1, wherein the first diesel fraction has a cloud point of about −25° C. or less and has an aromatics content of less than about 1.0 wt %.

9. The method of claim 1, wherein the lubricant base oil fraction comprises at least about 60 wt % of the hydrofinished effluent.

10. The method of claim 1, wherein the first diesel fraction comprises at least about 50 wt % of fuels fractions formed during said fractionating.

11. A method for producing a diesel fraction and a lubricant base oil, comprising:

contacting a feedstock having a T5 boiling point of at least about 650° F. (343° C.) with a hydrocracking catalyst under effective hydrocracking conditions for lubricant base oil production to produce a hydrocracked effluent, the effective hydrocracking conditions comprising a temperature of about 288° C. to about 449° C., a hydrogen partial pressure of about 250 psig to about 5000 psig, a liquid hourly space velocity of about 0.05 h$^{-1}$ to about 10 h$^{-1}$, and a hydrogen treat gas rate of about 200 SCF/B to about 10000 SCF/B;

dewaxing the hydrocracked effluent under effective catalytic dewaxing conditions in the presence of a dewaxing catalyst, the effective catalytic dewaxing conditions comprising a temperature of about 550° F. to about 840° F., a hydrogen partial pressure of about 250 psig to about 5000 psig, a liquid hourly space velocity of about 0.2 h$^{-1}$ to about 10 h$^{-1}$, and a hydrogen treat gas rate of about 200 SCF/B to about 10000 SCF/B;

hydrofinishing the hydrocracked, dewaxed effluent under effective hydrofinshing conditions in the presence of a hydrofinishing catalyst, the effective hydrofinishing conditions comprising a temperature of about 125° C. to about 425° C., a hydrogen partial pressure of about 500 psig to about 3000 psig, and a liquid hourly space velocity of about 0.1 h$^{-1}$ to about 5 h$^{-1}$; and fractionating the hydrocracked, dewaxed effluent to produce at least a naphtha product fraction, a first diesel fraction having a cetane number of at least 55, a second diesel fraction having a higher cut point temperature than a cut point temperature for the first diesel fraction, and a lubricant base oil fraction, the lubricant base oil fraction comprising at least about 50 wt % of the hydrocracked, dewaxed effluent, the first diesel fraction comprising at least about 20 wt % of the hydrocracked, dewaxed effluent, the second diesel fraction having a weight that is at least about 20% of a weight of the first diesel fraction, wherein the first diesel fraction has a density at a first temperature that is less than a density at the first temperature for the hydrocracked dewaxed effluent, the second diesel fraction having a density at the first temperature that is greater than the density at the first temperature for the hydrocracked dewaxed effluent.

12. The method of claim 11, wherein the hydrocracked, dewaxed effluent is fractionated prior to the hydrofinishing.

13. The method of claim 11, wherein the lubricant base oil fraction comprises at least about 60 wt % of the hydrocracked, dewaxed effluent and the first diesel fraction comprises at least about 50 wt % of fuels fractions formed during said fractionating.

14. The method of claim 11, wherein the first diesel fraction has a cetane number of at least about 55.

15. A method for producing a diesel fraction and a lubricant base oil, comprising:

contacting a feedstock having a T5 boiling point of at least about 700° F. (343° C.) and a sulfur content of about 100 wppm to about 2000 wppm with a hydrocracking catalyst under effective hydrocracking conditions to produce a liquid hydrocracked effluent, the effective hydrocracking conditions being effective for reducing the sulfur content of the liquid hydrocracked effluent to about 1 wppm or less, the 700+° F. conversion of the feedstock being about 30% or less, the effective hydrocracking conditions comprising a temperature of about 288° C. to about 449° C., a hydrogen partial pressure of about 250 psig to about 5000 psig, a liquid hourly space velocity of about 0.05 h$^{-1}$ to about 10 h$^{-1}$, and a hydrogen treat gas rate of about 200 SCF/B to about 10000 SCF/B;

fractionating liquid hydrocracked effluent to form a first fraction and a lubricant boiling range fraction, the lubricant boiling range fraction comprising at least 50 wt % of the liquid hydrocracked effluent;

dewaxing the first fraction under first effective catalytic dewaxing conditions in the presence of a dewaxing catalyst, the effective catalytic dewaxing conditions comprising a temperature of about 550° F. to about 840° F., a hydrogen partial pressure of about 250 psig to about 5000 psig, a liquid hourly space velocity of about 0.2 h$^{-1}$ to about 10 h$^{-1}$, and a hydrogen treat gas rate of about 200 SCF/B to about 10000 SCF/B; and fractionating the hydrocracked, dewaxed first fraction to produce at least a naphtha product fraction, a first diesel fraction having a T99.5 boiling point of about 393° C. or less, and a second diesel fraction having a higher T99.5 temperature than the first diesel fraction, a weight of the second diesel fraction being at least about 20% of a weight of the first diesel fraction, the first diesel fraction having a pour point of about −40° C. or less, a cetane number of at least about 55, and a sulfur content of less than about 1 wppm.

16. The method of claim 15, further comprising dewaxing the lubricant boiling range fraction under second effective catalytic dewaxing conditions in the presence of a dewaxing catalyst; and hydrofinishing the dewaxed lubricant boiling range fraction under second effective hydrofinshing conditions in the presence of a hydrofinishing catalyst to form a lubricant base oil.

17. The method of claim 16, wherein the second effective catalytic dewaxing conditions are the same as the first catalytic dewaxing conditions.

18. The method of claim 16, wherein the lubricant base oil fraction comprises at least about 60 wt % of the liquid hydrocracked effluent and the first diesel fraction comprises at least about 50 wt % of fuels fractions formed during said fractionating.

19. The method of claim 15, wherein the first diesel fraction comprises at least about 20 wt % of the hydrocracked, dewaxed first fraction.

20. The method of claim 1, wherein the hydrofinishing catalyst consists of one or more Group VIII noble metals on a support.

* * * * *